April 7, 1931.　　　G. FOWELL　　　1,799,415
PLUNGER FOR FARM PUMPS
Filed March 3, 1930
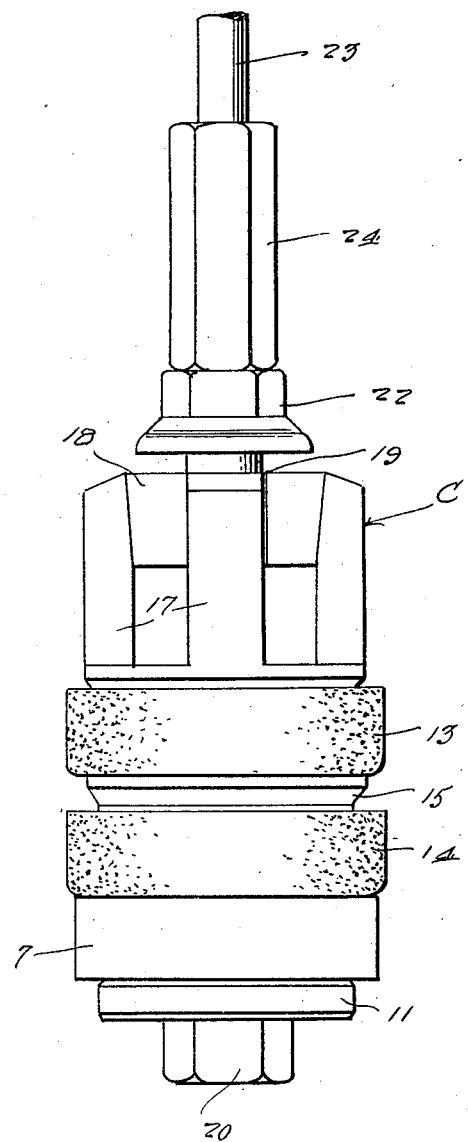
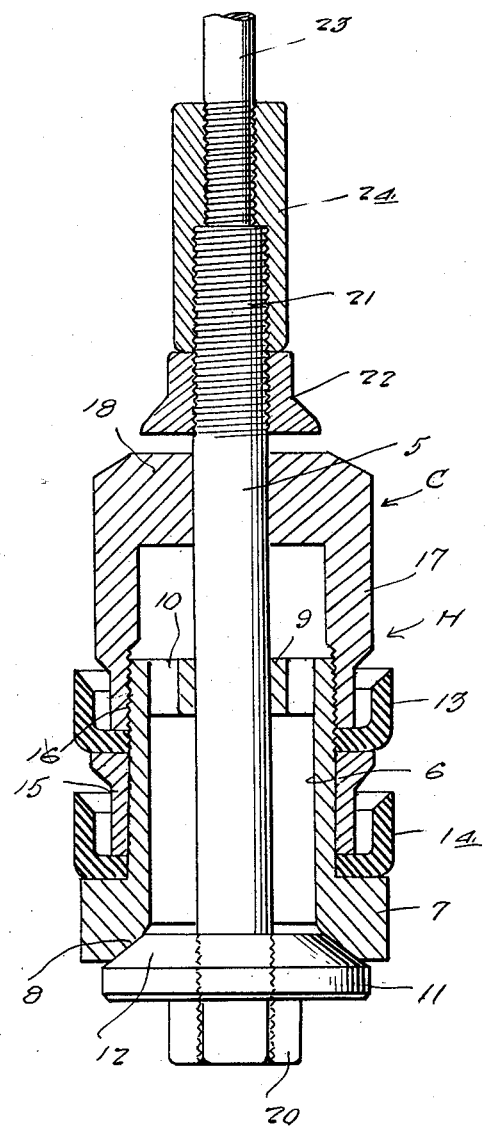
Inventor
Glen Fowell
By Clarence A. O'Brien
Attorney Patented Apr. 7, 1931

1,799,415

UNITED STATES PATENT OFFICE

GLEN FOWELL, OF RICHLAND CENTER, WISCONSIN

PLUNGER FOR FARM PUMPS

Application filed March 3, 1930. Serial No. 432,837.

This invention relates broadly to pumps, and has more particular reference to that type of pump generally used in conjunction with wells on farms.

A primary object of the present invention is to provide an improved valve for the piston head of pumps of this character.

As well known in the art, in pumps of this character, the valve controlling the cylindrical body of the piston head depends for its actuation entirely upon the weight of the column of water and the suction created during operation of the piston or plunger, and a very important object of the present invention is to provide a valve, the opening and seating of which is accomplished under action of the piston or plunger rod, and not merely depending upon the action of the water during the upward and downward stroke of the pump piston.

A still further object of the invention is to provide an improved valve for piston heads which is comparatively simple in construction, thoroughly reliable, practical and efficient in use, and otherwise well adapted for the purpose designed.

Other objects and advantages of the invention will become apparent during a study of the following description, taken in connection with the accompanying drawings, wherein:

Figure 1 is an elevational view of my improved piston head.

Figure 2 is a longitudinal sectional view taken therethrough.

With reference more in detail to the drawings, it will be seen that I have designated the piston or plunger rod generally by the reference character 5, and it will be noted that the same is of conventional construction.

The piston head is designated generally by the reference character H and comprises an open cylinder 6 at its lower end provided with an external annular flange or shoulder 7. At said lower flanged end, the cylinder is provided with a bevelled valve seat 8, while at its upper end, there is formed integral with the cylinder a spider structure 9, the hub 10 of which provides a guide for the piston rod 5.

The lower end of the piston rod 5 is threaded and has threaded thereon, a disc valve 11 having an upper bevelled peripheral portion 12 adapted to seat against the seat 8 for closing the lower end of the cylinder 6. Reference characters 13 and 14 respectively designate conventional types of leather cups disposed circumjacent the cylinder 6, the cup as is well known, adapted to bear against the pump casing, to provide a tight fit between the piston head and the casing.

Interposed between the leather cups 13 and 14 is a retaining nut 15, said nut 15 retaining the lower cup 14 seated against the flange 7 while the upper end of the nut 15 which is of conventional construction provides a seat for the upper cup 13.

A cage designated generally by the reference character C comprises an annular internally threaded lower portion 16 threaded on the upper end of the cylinder 6 within the upper cup 13 for retaining the cup seated on the upper end of the retaining nut 15. Vertical, circumferentially spaced arms 17 extend upwardly from the annular lower portion 16 and at their upper ends are formed with inwardly directed extensions 18 merging into a bearing 19 disposed in longitudinal alinement with the hub of the spider structure in the upper end of the cylinder 6, and cooperating therewith to form a second bearing for accommodating the upper portion or end of the piston rod 5.

A locking nut 20 is threaded on the lower end of the piston rod 5 for locking the disc valve 11 in position. The upper end of the piston rod 5 is threaded as at 21 and has threaded thereon a thumb nut 22 normally disposed in spaced relation with the upper end of the cage C when the valve 12 is in a seated position.

The upper end of the piston rod is connected with the lower end of the well tool 23, in the usual manner through the medium of the sleeve 24 threadedly received on the adjacent end of the rod 5 and tool 23.

The operation of the device may be briefly explained as follows: On the down-stroke of the piston rod, the valve 11 will be moved to an unseated position, the piston rod 5 moving downwardly through the cage and cylinder 6 until the nut 22 abuts the upper end of the cage, so that consequently during the down stroke, the water will enter the cylinder 6 through the lower end thereof.

Upon the upstroke, the piston rod 5 will move upwardly through the cylinder 6 and cage C to seat the valve 11 upon its seat 8, closing the lower end of the cylinder 6. Thus it is apparent that the opening and seating of the valve does not depend upon the pressure exerted thereon during the reciprocatory action of the plunger, but rather through the sliding movement of the piston 5 relative to the piston head, the seating and unseating of the valve is occasioned.

One peculiar advantage of this feature is that water expulsion will be increased approximately twenty-five percent than has been obtained by the ordinary type of piston head and cylinder parts thereof now used, while at the same time, leaking of the valve is practically eliminated since the accumulation of particles of sand between the valve and the seat resulting in great wear will also be practically eliminated.

It is thought from the foregoing description, taken in connection with the accompanying drawings, a clear understanding of the operation, utility and advantages of the invention of this character will be had by those skilled in the art without more detailed description.

Even though I have herein shown and described the preferred embodiment of my invention, it is to be understood that the same is susceptible to changes fully comprehended by the spirit of the invention as herein described, and the scope of the appended claim.

Having thus described my invention, what I claim as new is:

A working valve for pumps comprising a piston rod, a cylinder receiving said rod provided at its lower end with an annular flange, the inner face of said flange at its lower end being provided with a bevelled valve seat, a valve body on said piston rod for engaging the seat, a guide connected with the upper end of the cylinder engaging the piston rod, the outer face of the cylinder at its upper end being threaded, a cup washer on the outer face of said cylinder seated on the opposite face of the flange, a spacing ring on the outer face of the cylinder engaging said cup washer, a second cup washer on the cylinder engaging the spacing ring, a cage slidable on the piston rod threaded on the threaded end of the cylinder in engagement with the second cup washer, and a stop nut on said piston rod for engaging the outer face of the cage when the valve body is unseated.

In testimony whereof I affix my signature.

GLEN FOWELL.